United States Patent

Wideman et al.

[11] Patent Number: 5,252,650
[45] Date of Patent: Oct. 12, 1993

[54] RUBBER COMPOUNDS CONTAINING ALKYL (C12-C22) ESTERS OF A MIXTURE OF FATTY ACIDS

[75] Inventors: Lawson G. Wideman; Paul H. Sandstrom, both of Tallmadge; Denise J. Keith, Akron, all of Ohio

[73] Assignee: The Goodyear Tire & Rubber Company, Akron, Ohio

[21] Appl. No.: 934,201

[22] Filed: Aug. 24, 1992

[51] Int. Cl.$^5$ ................................ C08K 5/11
[52] U.S. Cl. .................................... 524/318
[58] Field of Search ........................ 524/318

[56] References Cited

U.S. PATENT DOCUMENTS

| | | | |
|---|---|---|---|
| 4,507,418 | 3/1985 | Utsunomiya et al. | 524/318 |
| 4,870,135 | 9/1989 | Mowdood et al. | 525/236 |
| 4,996,258 | 2/1991 | Wideman et al. | 524/274 |
| 5,023,290 | 6/1991 | Gaidis | 524/322 |
| 5,039,726 | 8/1991 | Wideman et al. | 524/271 |

FOREIGN PATENT DOCUMENTS 1297440 11/1989 Japan .................. 524/318

OTHER PUBLICATIONS

CA77(20):127724j.
CA98(8):55117X.
CA105(14):115905c.
CA99(16):123564p.

*Primary Examiner*—Kriellion S. Morgan
*Attorney, Agent, or Firm*—Bruce J. Hendricks

[57] ABSTRACT

The present invention relates to rubber compounds containing alkyl ($C_{12}$-$C_{22}$) esters of a mixture of fatty acids which are useful as a total or partial replacement for extender or processing oil in rubber formulations. The alkyl ($C_{12}$-$C_{22}$) esters of a mixture of fatty acids are also useful as a total or partial replacement for waxes in rubber formulations. Addition of the alkyl ($C_{12}$-$C_{22}$) esters of a mixture of fatty acids improve the ozone resistance of the vulcanizate.

10 Claims, No Drawings

RUBBER COMPOUNDS CONTAINING ALKYL (C12-C22) ESTERS OF A MIXTURE OF FATTY ACIDS

BACKGROUND OF THE INVENTION

Both natural and synthetic elastomers usually require the use of antiozonants to improve resistance to the attack of ozone in the finished rubber products. Certain waxy materials, added in excess of their solubility in rubbers, will bloom to the surface after vulcanization. The surface film of wax provides protection from the atmosphere so long as the film remains. Paraffin, microcrystalline waxes and various combinations of waxes are examples of such waxes and are commonly used in combination with antiozonants. Paraffin waxes bloom very quickly whereas microcrystalline blends bloom more slowly. Commonly a combination of waxes are used.

Natural and synthetic elastomers typically require the use of processing aids to assist mechanical blending and compounding. Materials such as mixtures of oil soluble sulfonic acids of high molecular weight with a high boiling alcohol, paraffin oils, blends of sulfonated petroleum products and selected mineral oils are conventionally used as processing aids. Additional examples include petroleum, paraffinic and vegetable oils, coal tar, petroleum residues or pitches and naturally occurring or synthetic resins. One advantage in using processing aids is they assist the incorporation of fillers and other ingredients with low power requirements since the processing aids reduce internal friction in calendering and extrusion. By reducing the amount of friction during compounding, the temperature of the rubber will remain lower and thus minimize the possibility of scorch.

SUMMARY OF THE INVENTION

The present invention relates to rubber compounds containing alkyl ($C_{12}$-$C_{22}$) esters of a mixture of fatty acids. The alkyl ($C_{12}$-$C_{22}$) esters of a mixture of fatty acids may be used as a wax substitute and/or extender/processing oil in a rubber vulcanizate. Addition of the alkyl ($C_{12}$-$C_{22}$) esters of a mixture of fatty acids improves ozone resistance and tear properties of the vulcanizate.

DETAILED DESCRIPTION OF THE INVENTION

There is disclosed a process for preparing rubber compounds which comprises admixing a rubber selected from the group consisting of natural rubber, homopolymers of conjugated diolefins, copolymers of conjugated diolefins and ethylenically unsaturated monomers or mixtures thereof with a rubber compound containing alkyl ($C_{12}$-$C_{22}$) esters of a mixture of fatty acids.

There is also disclosed a rubber composition which comprises (1) a rubber selected from the group consisting of natural rubber, homopolymers of conjugated diolefins, copolymers of conjugated diolefins and ethylenically unsaturated monomers or mixtures thereof and an alkyl ester of a mixture of fatty acids wherein the alkyl consists of an aliphatic radical having from about 12 to about 22 carbon atoms and the fatty acid mixture contains from about 2 to 67 percent by weight of stearic acid, 0.3 to 48 percent by weight of oleic acid and 0.1 to 49 percent by weight of palmitic acid.

The fatty acid mixture contains 16 and 18 carbon straight chain saturated fatty acids. The fatty acid mixture will also contain fatty acids having monounsaturation. The fatty acid mixture must contain from about 2 to 67 percent by weight of stearic acid, 0.3 to 48 percent of oleic acid and 0.1 to 49 percent by weight of palmitic acid. Preferably, the mixture contains from about 34 to 60 percent by weight of stearic acid, 0.5 to 8 percent by weight of oleic acid, and 5 to 49 percent by weight of palmitic acid. In addition to these three fatty acids, the mixture may contain 9,12-linoleic acid, 9,11-linoleic (conjugated linoleic acid), pinolenic acid, eicosenoic acid, palmitoleic acid, magaric acid, octadecadienoic acid, octadectrienoic acid and the like. The above fatty acids other than the three major fatty acids may comprise from about 0 to 50 percent by weight of the overall fatty acid mixture. In addition to the fatty acids, the fatty acid mixture may contain minor amounts of rosin acids. For use in the present invention, the rosin acid component should not exceed 8% by weight of the total weight of mixture of fatty acids. Rosin acids that are generally found in tall oil fatty acid mixtures may include abietic acid, dihydroabietic acid, palustric/levopimaric acid, 9,10-secodehydroabietic acid, pimaric acids, tetrahydroabietic acid, isopimaric acid, neoabietic acid, and the like. The respective weight percentages of the fatty acids may be determined according to ASTM D-803-65. The respective weight percentages of the rosin acids may be determined by ASTM D-1240-54.

The mixture of fatty acids is reacted with an aliphatic alcohol having from about 12 to about 22 carbon atoms under esterification conditions. Therefore, the $C_{12}$-$C_{22}$ alkyl groups of the esters of mixed fatty acids are derived from the aliphatic alcohol. Representative of the aliphatic alcohols which may be used in the present invention include dodecyl alcohol, tridecyl alcohol, tetradecyl alcohol, pentadecyl alcohol, hexadecyl alcohol, heptadecyl alcohol, octadecyl alcohol, nonadecyl alcohol, eicosyl alcohol, heneicosyl alcohol, docosyl alcohol or mixtures thereof. Preferably the aliphatic alcohol is dodecyl alcohol, hexadecyl alcohol or octadecyl alcohol.

The mole ratio of the fatty acids to aliphatic alcohol may vary. Generally, the mole ratio of fatty acids to aliphatic alcohol will range from about 0.5 to about 1.5. Preferably the mole ratio of fatty acids to aliphatic alcohol is from about 0.6 to about 1.0.

An organic solvent may be used to dissolve the mixture of fatty acids, to increase heat transfer and to facilitate water removal through a reflux trap. The solvent is preferably inert to the esterification reaction. Illustrative of solvents suitable for use in the practice of this invention include: saturated and aromatic hydrocarbons, e.g., hexane, octane, dodecane, naphtha, decalin, tetrahydronaphthalene, kerosene, mineral oil, cyclohexane, cycloheptane, alkyl cycloalkane, benzene, toluene, xylene, alkyl-naphthalene, and the like; ethers such as tetrahydrofuran, tetrahydropyran, diethylether, 1,2-dimethoxybenzene, 1,2-diethoxybenzene, dialkylethers of ethylene glycol, propylene glycol, butylene glycol, diethylene glycol, dipropylene glycol, oxyethyleneoxypropylene glycol, and the like; fluorinated hydrocarbons that are inert under the reaction conditions such as perfluoroethane, monofluorobenzene, and the like. Another class of solvents are sulfones such as dimethylsulfone, diethylsulfone, diphenolsulfone, sulfolane, and the like. Mixtures of the aforementioned solvents may be employed so long as they are compatible with each other under the conditions of the reaction and will adequately dissolve the fatty acids and not interfere with the esterification reaction.

The esterification reaction may be conducted in the presence of a catalyst to speed up the reaction. Examples of catalysts that may be used include condensation catalysts, e.g., dibutyltin oxide or butyl stannoic acid. In addition acid catalysts may be used such as sulfuric acid, hydrochloric acid and toluenesulfonic acid. The amount of catalyst that is used will vary depending on the particular catalyst that is selected. For example, when an acid catalyst is used, from about 5 weight percent to about 10 weight percent is recommended.

The esterification reaction may be conducted over a variety of temperature ranges. The temperatures may range from moderate to an elevated temperature. In general, the esterification reaction may be conducted at a temperature ranging from about 100° C. to about 250° C. In most cases, when operating at the lower end of the temperature range, it is desirable to utilize pressures at the higher end of the range. The preferred temperature range is from about 110° C. to about 200° C., while the most preferred temperature range is from about 120° C. to about 190° C.

The esterification reaction may be conducted over a variety of pressures. Preferably the reaction is conducted at a pressure range of from about 0 to about 100 psig.

The esterification reaction is conducted for a period of time sufficient to produce the desired alkyl esters of the fatty acid. In general, the reaction time can vary from minutes to several hours. If the more sluggish reaction conditions are selected, then the reaction time will have to be extended until the desired product is produced. It is appreciated that the residence time of the reactants will be influenced by the reaction temperature, concentration and choice of catalyst, if any, reaction pressure, concentration and choice of solvent, and other factors.

The esterification reaction may be carried out in a batch, semi-continuous or continuous manner. The esterification reaction may be conducted in a single reaction zone or in a plurality of reaction zones, in series or in parallel. The reaction may be conducted intermittently or continuously. The reaction may be conducted in a vessel equipped with a thermometer, stirrer and a distillation column to separate water that distills from reactants and optionally a Dean Stark trap. The reactor may be fitted with internal and/or external heat exchangers to control temperature fluctuations. Preferably, an agitation means is available to ensure a uniform reaction. Mixing induced by vibration, shaker, stirrer, rotating, oscillation, etc. are all illustrative of the types of agitation means which are contemplated for use in the esterification reaction. Such agitation means are available and well known to those skilled in the art.

Aside from functioning as a processing oil or wax replacement, addition of the rubber compounds containing alkyl ($C_{12}$-$C_{22}$) esters of the mixture of fatty acids to sulfur vulcanizable elastomers enhances many physical properties of the vulcanizate. The term "rubber" or "elastomer" as used herein embraces both natural rubber and all its various raw and reclaim forms as well as various synthetic rubbers. Representative synthetic polymers are the homopolymerization products of butadiene and its homologues and derivatives, as for example, methylbutadiene, dimethylbutadiene, chloroprene (neoprene synthetic rubber) and pentadiene as well as copolymers such as those formed from butadiene or its homologues or derivatives with other unsaturated organic compounds. Among the latter are acetylenes, e.g., vinyl acetylene; olefins, for example, isobutylene, which copolymerizes with isoprene to form butyl rubber; vinyl compounds, for example vinylchloride, acrylic acid, acrylonitrile (which polymerizes with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Also included are the various synthetic rubbers prepared by the homopolymerization of isoprene and the copolymerization of isoprene with other diolefins and various unsaturated organic compounds. Additionally, included are the synthetic rubbers such as 1,4-cis polybutadiene and 1,4-cis polyisoprene and similar synthetic rubbers such as EPDM. The preferred rubbers for use with the present invention are natural rubber, polybutadiene, SBR, styrene-isoprene-butadiene rubber, and polyisoprene.

The vulcanizates containing rubber compounds containing the alkyl ($C_{12}$-$C_{22}$) esters of the mixture of fatty acids find utility in, for example, motor mounts, rubber bushings, power belts, printing rolls, rubber shoe heels and soles, rubber floor tiles, caster wheels, elastomer seals and gaskets, conveyor belt covers, wringers, hard rubber battery cases, automobile floor mats, mud flaps for trucks, ball mill liners, and the like.

The rubber compounds containing alkyl ($C_{12}$-$C_{22}$) esters of the mixture of fatty acids may be used in a wide variety of proportions in the rubber and may be a substitute, in whole or part for conventional extender or process oils. By the term "extender or process oils", it is meant oils such as aromatic oils, naphthenic oils, paraffinic oils and the like as well as blends thereof. Specific examples of such oils include those largely composed of naphthenic and alkylated naphthenic hydrocarbons and mixtures thereof with various aromatic hydrocarbons. Such oils may be obtained from the high boiling fractions of the so-called naphthenic or mixed crude oils. They may comprise distillate fractions boiling above about 200° C. Suitable fractions are those at least 90 percent of which boil above about 250° C. as more volatile members may be lost during or after compounding and curing the rubber. Generally, the level of rubber compounds containing alkyl ($C_{12}$-$C_{22}$) esters of the mixture of fatty acids that may be added to the rubber may range from about 2 phr (parts per hundred rubber) to about 50 phr. Preferably the amount that is added ranges from about 5 phr to about 35 phr.

Vulcanization of the rubber is generally carried out at temperatures of between about 100° C. and 200° C. Preferably, the vulcanization is conducted at temperatures ranging from about 110° C. to 180° C. Any of the usual vulcanization processes may be used such as heating in a press or mold, heating with superheated steam or hot air or in a salt bath.

In addition to the alkyl ($C_{12}$-$C_{22}$) esters of a mixture of fatty acids, other rubber additives may also be incorporated in the sulfur vulcanizable material. The additives commonly used in rubber vulcanizates are, for example, carbon black, tackifier resins, processing aids, antioxidants, antiozonants, stearic acid, activators, oils and peptizing agents. As known to those skilled in the art, depending on the intended use of the sulfur vulcanizable material, certain additives mentioned above are commonly used in conventional amounts. Typical additions of carbon black comprise about 20 to 100 parts by weight of diene rubber (phr), preferably 50 to 70 phr. Typical amounts of tackifier resins comprise about 5 to 10 phr. Typical amounts of processing aids comprise about 1 to 5 phr. Typical amounts of antioxidants comprise 1 to about 10 phr. Typical amounts of antiozonants comprise 1 to about 20 phr. Typical amounts of stearic acid comprise 1 to about 2 phr. Typical amounts of zinc oxide comprise 2 to 5 phr. Typical amounts of oils comprise 5 to 30 phr. Typical amounts of peptizers comprise 0.1 to 1 phr. The presence and relative amounts of the above additives are not an aspect of the present invention.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to 8 phr with a range of from 1.5 to 2.25 being preferred.

Accelerators are used to control the time and/or temperature required for vulcanization and to improve the properties of the vulcanizate. In one embodiment, a single accelerator system may be used, i.e., primary accelerator. Conventionally, a primary accelerator is used in amounts ranging from about 0.5 to 2.0 phr. In another embodiment, combinations of two or more accelerators may be used which may consist of a primary accelerator which is generally used in the larger amount (0.5 to 1.0 phr), and a secondary accelerator which is generally used in smaller amounts (0.05–0.50 phr) in order to activate and to improve the properties of the vulcanizate. Combinations of these accelerators have been known to produce a synergistic effect of the final properties and are somewhat better than those produced by use of either accelerator alone. In addition, delayed action accelerators may be used which are not effected by normal processing temperatures but produce satisfactory cures at ordinary vulcanization temperatures. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a secondary accelerator is used, the secondary accelerator is preferably a guanidine, dithiocarbamate or thiuram compound.

The following examples are presented in order to illustrate but not limit the present invention.

EXAMPLE 1 (Control)

Preparation of Stearyl Stearate 71.1 grams (0.25 mole) of purified stearic acid (melting point 70° C.) and 101.5 grams (0.375 mole) of 1-octadecanol were added to 5.5 grams of toluenesulfonic acid in 100 ml of m-xylene and charged into a Dean-Stark equipped 1-liter round bottom flask. After 4 hours of reflux under nitrogen at a pot temperature of 180° C., 6 ml of water was collected. The solvent and any excess alcohol were stripped under 29 inches of mercury vacuum at 130° C. to give 151 grams of a solid having a melting point of 58° C. The acid number of the product was 3.0. Infrared spectroscopic analysis showed formation of the ester function.

EXAMPLE 2 (Control)

Preparation of Stearyl Palmitate 128 grams (0.5 mole) of purified palmitic acid (melting point 63° C.) and 203 grams (0.75 mole) of 1-octadecanol were added to 11 grams of toluenesulfonic acid in 130 ml of m-xylene and charged into a Dean-Stark equipped 1-liter round bottom flask. After 6 hours of reflux under nitrogen at a pot temperature of 190° C., 13 ml of water was collected. The solvent and any excess alcohol were stripped under 29 inches of mercury vacuum at 130° C. to give 329 grams of a solid having a melting point of 55° C. The acid number of the product was 0. Infrared spectroscopic analysis showed formation of the ester function.

EXAMPLE 3

Preparation of the Alkyl ($C_{18}$) Ester of a Mixture of Fatty Acids

A mixture of fatty acids were used for this example and contained 56% by weight of stearic acid, 29% palmitic acid, 8% by weight oleic acid and 7% by weight other fatty acids.

142.5 grams (0.5 mole) of the mixture of fatty acids and 203 grams of 1I-octadecanol were added to 11 grams of toluenesulfonic acid in 130 ml of m-xylene and charged into a Dean-Stark equipped 1-liter round bottom flask. After 6 hours of reflux under nitrogen at a pot temperature of about 194° C., 13 ml water was collected. The solvent was removed under 29 inches of mercury vacuum at 130° C. to give 300 grams of waxy product having a melting point of 53° C. The acid number of the product was 2.8. Excess alcohol was removed in the vacuum oven at 80° C. Infrared spectroscopic analysis showed formation of the ester function.

EXAMPLE 4

Alkyl ($C_{18}$) Ester of a Mixture of Tall Oil Fatty Acids 140 grams (0.5 mole) of a mixture of more unsaturated fatty acids, L-5 TOFA, from Westvaco, and 203 grams (0.75 mole) of 1-octadecanol were added to 11 grams of toluenesulfonic acid in 130 ml of m-xylene and charged into a Dean-Stark equipped 1-liter round bottom flask. Westvaco L-5 has been determined by GC to comprise 39% oleic acid, 27% linoleic, 6% conjugated linoleic, 4.7% rosin acid, 2% stearic acid, 0.9% palmitic acid, and 20.4% other fatty acids. After 6 hours of reflux under nitrogen at a pot temperature of 188° C., 11 ml of water was collected. The solvent and any excess alcohol were removed under 29 inches of mercury vacuum at 30° C. to give 310 grams of a waxy semi-solid material. The acid number of the product was 5. Infrared spectroscopic analysis showed formation of the ester function.

EXAMPLES 5–9

Rubber compositions containing the materials set out in Table I were prepared in a BR Banbury using two separate stages of addition. In addition 1.5 phr of the wax, alkyl ester of a fatty acid (from Example 1 and 2) or alkyl ester of a mixture of fatty acids (from Examples 3 and 4) was added to the Banbury during the first stage of mixing.

TABLE I

| Material | Weight Parts | Banbury Stage |
|---|---|---|
| Natural Rubber | 40.00 | 1 |
| BUD 1207 ®[1] | 60.00 | 1 |
| Carbon Black | 50.00 | 1 |
| Antiozonant/Antioxidant | 4.00 | 1 |
| Rosin/Fatty Acids | 3.00 | 1 |
| Zinc Oxide | 3.00 | 1 |
| Tackifier | 4.00 | 1 |
| Processing Oil | 5.00 | 1 |
| Sulfur/Accelerator | 2.60 | 2 |

[1] A high cis-1,4-polybutadiene rubber commercially available from The Goodyear Tire & Rubber Company.

Table II below sets out the cure behavior and vulcanizate properties for the controls and the compound containing alkyl ($C_{12}$–$C_{22}$) esters of a mixture of fatty acids.

TABLE II

Cure Behavior and Vulcanizate Properties for Examples 5-9

| | Control Wax[1] | Control Stearyl Stearate Example 1 | Control Stearyl Palmitate Example 2 | Alkyl Ester of Example 3 | Alkyl Ester of Example 4 |
|---|---|---|---|---|---|
| Rheometer 150° C. | | | | | |
| Max Torque | 33.2 | 32.9 | 33.4 | 33.0 | 33.2 |
| Min. Torque | 9.0 | 8.7 | 8.9 | 8.7 | 8.8 |
| t90, minutes | 21.6 | 21.7 | 22.2 | 22.0 | 22.1 |
| t25, minutes | 8.0 | 7.9 | 8.1 | 8.0 | 8.0 |
| Stress Strain (original) | | | | | |
| Tensile Strength, MPa | 13.0 | 13.1 | 12.0 | 12.5 | 12.0 |
| Elongation at Break (%) | 574 | 583 | 538 | 558 | 540 |
| 300% Modulus (MPa) | 6.36 | 6.27 | 6.33 | 6.30 | 6.27 |
| Hardness | | | | | |
| Room Temperature | 54.2 | 54.2 | 53.5 | 53.5 | 53.0 |
| 100° C. | 50.6 | 51.0 | 50.5 | 50.4 | 51.1 |
| Strebler to Itself, 95° C., Newtons | 88 | 82 | 83 | 90 | 95 |
| Rebound (ASTM D1054) | | | | | |
| 100° C. | 65.9 | 65.4 | 65.2 | 65.6 | 65.3 |
| Room Temperature, % | 57.7 | 56.1 | 56.8 | 57.0 | 58.6 |

[1] Mixture of microcrystalline wax and paraffinic wax.

| | Wax | Control Ex. 1 | Control Ex. 2 | Alkyl Ester of Ex. 3 | Alkyl Ester of Ex. 4 |
|---|---|---|---|---|---|
| Cyc Ozone[1] (Orig) | | | | | |
| 3 DAYS | 0 | 0 | 0 | 0 | 0 |
| 4 DAYS | 1/2-0 | 1/2-0 | 1/2-0 | 1/2-0 | 1/2-0 |
| 12 DAYS | 3/2 | 4/3 | 3/2 | 3/2 | 4/1 |
| 15 DAYS | 4/10 | 4/10 | B | 4/10 | 4/5 |
| 16 DAYS | 4/10 | B | | 4/10 | 4/5 |
| 18 DAYS | 4/10 | | | 4/10 | B |
| 19 DAYS | B | | | B | |
| Cyc Ozone (Aged[1] 7 Days @ 70° C.) | | | | | |
| 4 DAYS | 0 | 0 | 0 | 0 | 0 |
| 7 DAYS | 1/2-0 | 1/2-0 | 1/2-0 | 1/2-0 | 1/2-0 |
| 9 DAYS | 2/1 | 2/1 | 2/1 | 2/1 | 2/1 |
| 10 DAYS | 3/1 | 2/1 | 2/1 | 2/1 | 2/1 |
| 15 DAYS | B | B | B | 4/5 | 4/5 |
| 17 DAYS | | | | B | B |
| 18 DAYS | | | | | |

[1] Cycle D3395 - using a cycled ozone on/off procedure

| Density | Severity |
|---|---|
| 0 = none | 0 = none |
| ½ = edge | 1 = .01 in. |
| 1 = ¼ surface | 3 = .03 in. |
| 2 = ½ surface | 5 = .10 in. |
| 3 = ¾ surface | 10 = .25 in. |
| 4 = ⅞ surface | 12 = +.25 in. |
| B = broken | |

As can be seen by the above data, use of the present invention (materials of Examples 3 and 4) versus the controls does not result in any sacrifice in cure behavior or cure properties such as stress strain, hardness, rebound and tear (as measured by Strebler adhesion to itself). The advantages of the present invention are readily apparent from the analysis of the cyclic ozone data. Compared to the standard microcrystalline and paraffinic wax, the alkyl ($C_{12}$–$C_{22}$) esters of a mixture of fatty acids (Examples 3 and 4) provide similar original cyclic ozone data. However, prepaging of the samples prior to the cyclic ozone testing indicate the superiority of the alkyl ($C_{12}$–$C_{22}$) esters of a mixture of fatty acids. The importance in the use of a mixture of fatty acids is readily apparent when comparing the present invention to the controls in which a single fatty acid was used (Examples 1 and 2).

EXAMPLES 10 AND 11

Rubber compositions containing the materials set out in Table III were prepared in a BR Banbury using two separate stages of addition. In addition, 5.0 phr of a processing oil or the alkyl ester of a mixture of fatty acids from Example 3 was added to the Banbury during the first stage of mixing.

TABLE III

| Material | Weight Parts | Banbury Stage |
|---|---|---|
| Natural Rubber | 100 | 1 |
| Carbon Black | 50.00 | 1 |
| Antioxidant | 2.00 | 1 |
| Fatty Acid | 1.00 | 1 |
| Zinc Oxide | 5.00 | 1 |
| Retarder | 0.20 | 2 |
| Sulfur | 1.65 | 2 |
| Accelerator[1] | 1.25 | 2 |

[1] Sulfenamide type.

Table IV below sets out the cure behavior and vulcanizate properties for the rubber compound containing 5.0 phr of processing oil (control) and the compound containing alkyl ($C_{12}$–$C_{22}$) esters of a mixture of fatty acids prepared in Example 3.

TABLE IV

Cure Behavior and Vulcanizate Properties for Examples 11 and 12

| | Processing Oil 5.0 phr | Alkyl Ester of Example 3 5.0 phr |
|---|---|---|
| Rheometer 150° C. | | |
| Max. Torque | 41.4 | 40.5 |
| Min. Torque | 11.3 | 10.8 |
| t90, minutes | 20.9 | 20.1 |
| t25, minutes | 14.0 | 13.4 |
| Stress Strain (original) | | |
| Tensile Strength, MPa | 20.4 | 21.7 |
| Elongation at Break (%) | 494 | 506 |
| 300% Modulus (MPa) | 11.4 | 12.8 |
| Hardness | | |
| Room Temperature | 61.4 | 65.2 |
| 100° C. | 55.3 | 57.0 |
| Strebler to Itself, 95° C., Newtons | 215 | 229 |
| Rebound (ASTM D1054) | | |
| 100° C. | 45.7 | 42.4 |
| Room Temperature, (%) | 57.1 | 56.9 |
| E' at 60° C. (MPa) | 22.0 | 18.1 |
| Tan Delta at 60° C. | 0.126 | 0.110 |

The purpose of a processing aid is to reduce compound viscosity during mixing and processing. As can be seen above, use of the alkyl ($C_{12}$–$C_{22}$) esters of a mixture of fatty acids results in a lower minimum torque value compared to the control processing oil. The cure behavior and cure properties are not sacrificed by use of the alkyl ($C_{12}$–$C_{22}$) esters of a mixture of fatty acids.

EXAMPLES 12–14

Rubber compositions containing the materials set out in Table V were prepared in a BR Banbury using two separate stages of addition. In addition, Example 12 (Control) contained 1.0 phr of a microcrystalline wax and 0.5 phr of a paraffinic wax. Example 13 also contained 1.0 phr of a microcrystalline wax, 0.5 phr of a paraffinic wax and 1.5 phr of the alkyl ester of a mixture of fatty acids prepared in Example 3. Example 14 also contained 1.5 phr of the alkyl ester of a mixture of fatty acids prepared in Example 3.

TABLE V

| Material | Weight Parts | Banbury Stage |
|---|---|---|
| Natural Rubber | 40.00 | 1 |
| BUD 1207 ®[1] | 60.00 | 1 |
| Carbon Black | 50.00 | 1 |
| Antiozonant/Antioxidant | 4.00 | 1 |
| Rosin/Fatty Acids | 3.00 | 1 |
| Zinc Oxide | 3.00 | 1 |
| Tackifier | 4.00 | 1 |
| Processing Oil | 5.00 | 1 |
| Sulfur/Accelerator | 2.60 | 2 |

[1]A high cis-1,4-polybutadiene rubber commercially available from The Goodyear Tire & Rubber Company.

Table VI below sets out the cure behavior and vulcanizate properties for Example 13 (control) and the compounds (Examples 14 and 15) containing alkyl ($C_{12}$–$C_{22}$) esters of a mixture of fatty acids prepared in Example 3.

TABLE VI

Cure Behavior and Vulcanizate Properties for Examples 12–14

| | Control 1.5 phr of Wax[1] | Wax[1] and 1.5 phr of Alkyl Ester of Example 3 | 1.5 phr of Alkyl Ester of Example 3 |
|---|---|---|---|
| Rheometer 150° C. | | | |
| Max. Torque | 33.1 | 30.9 | 33.4 |
| Min. Torque | 8.1 | 8.1 | 8.4 |
| t90, minutes | 21.0 | 18.3 | 20.7 |
| t25, minutes | 7.5 | 7.4 | 7.4 |
| Stress Strain (original) | | | |
| Tensile Strength, MPa | 11.3 | 12.2 | 11.6 |
| Elongation at Break (%) | 507 | 568 | 504 |
| 300% Modulus (MPa) | 6.2 | 5.6 | 6.4 |
| Hardness | | | |
| Room Temperature | 52.6 | 51.0 | 53.5 |
| 100° C. | 50.5 | 48.0 | 51.1 |
| Strebler to Itself, 95° C., Newtons | 86 | 122 | 71 |
| Rebound (ASTM D1054) | | | |
| 100° C. | 63.8 | 62.4 | 58.1 |
| Room Temperature, (%) | 57.7 | 57.0 | 51.1 |

[1]1.5 phr of a mixture of 1.0 phr microcrystalline wax and 0.5 phr paraffinic wax.

| | 2.0 phr Wax | Wax[2] and 1.5 phr of Alkyl Ester of Ex. 3 | 1.5 phr of Alkyl Ester of Ex. 3 |
|---|---|---|---|
| Cyc Ozone[1] (Orig) | | | |
| 3 DAYS | 0 | 2-1 | 0 |
| 7 DAYS | 4-3 | 4-5 | 4-1 |
| 9 DAYS | 4-5 | 4-10 | 4-1 |
| 14 DAYS | B | B | 4-5 |
| 20 DAYS | | | B |
| Cyc Ozone (Aged[1] 7 Days @ 70° C.) | | | |
| 3 DAYS | 0 | 0 | 0 |
| 7 DAYS | 1/2-0 | 1/2-0 | 0 |
| 10 DAYS | 2-1 | 2-1 | 1/2-0 |
| 13 DAYS | 2-1 | 2-1 | 1-1 |
| 17 DAYS | 3-10 | 4-12 | 4-3 |
| 20 DAYS | B | B | 4-5 |

[1]Cycle D3395 - using a cycled ozone on/off procedure

| Density | Severity |
|---|---|
| 0 = none | 0 = none |
| ½ = edge | 1 = .01 in. |
| 1 = ⅛ surface | 3 = .03 in. |
| 2 = ⅜ surface | 5 = .10 in. |
| 3 = ⅝ surface | 10 = .25 in. |
| 4 = ⅞ surface | 12 = +.25 in. |
| B = broken | |

[2]Mixture of 1.5 phr microcrystalline wax and 0.5 phr paraffinic wax.

As can be seen above, the kinetic cyclic ozone data demonstrates the superiority of the alkyl ($C_{12}$–$C_{22}$) esters of a mixture of fatty acids versus the same weight amount of a conventional microcrystalline/paraffinic wax mixture.

What is claimed is:

1. A process for preparing rubber compounds which comprises admixing a rubber selected from the group consisting of natural rubber, homopolymers of conjugated diolefins copolymers of conjugated diolefins and ethylenically unsaturated monomers or mixtures thereof with alkyl esters of a mixture of fatty acids wherein the alkyl contains 18 carbon atoms and said mixture of fatty acids contains from about 2 to 67 percent by weight of stearic acid, 0.3 to 48 percent by weight of oleic acid and 0.1 to 49 percent by weight of palmitic acid.

2. A process for preparing rubber compounds according to claim 1 wherein the alkyl esters of the mixture of fatty acids are at a concentration of from about 2 parts per hundred rubber to 50 parts per hundred rubber and is in an intimate mixture with said rubber.

3. The process of claim 2 wherein said alkyl esters of a mixture of fatty acids are added to a rubber selected from the group consisting of natural rubber, homopolymers of conjugated diolefins and copolymers of conjugated diolefins and ethylenically unsaturated monomers.

4. The process of claim 2 wherein said alkyl esters of a mixture of fatty acids are at a concentration of from about 5 parts per hundred rubber to 35 parts per hundred rubber.

5. The process of claim 1 wherein said mixture of fatty acids contains from about 34 to 60 percent by weight of stearic acid, 0.5 to 8 percent by weight oleic acid and 5 to 49 percent by weight of palmitic acid.

6. A rubber compound which comprises (1) a rubber selected from the group consisting of natural rubber, homopolymers of conjugated diolefins and copolymers of conjugated diolefins, ethylenically unsaturated monomers or mixtures thereof and (2) alkyl esters of a mixture of fatty acids wherein said alkyl contains 18 carbon atoms and said mixture of fatty acids contains from about 2 to 67 percent by weight of stearic acid, from about 0.3 to 48 percent by weight of oleic acid and from about 0.1 to 49 percent by weight of palmitic acid.

7. The rubber compound of claim 6 wherein the rubber is selected from the group consisting of natural rubber, polybutadiene, SBR, polyisoprene or mixtures thereof.

8. The rubber compound of claim 6 wherein said alkyl esters of a mixture of fatty acids are at a concentration of from about 20 parts per hundred rubber to 50 parts per hundred rubber.

9. The rubber compound of claim 8 wherein said esters of a mixture of fatty acids are at a concentration of from about 5 parts per hundred rubber to 35 parts per hundred rubber.

10. The rubber compound of claim 6 wherein said mixture of fatty acids contains from about 34 to 60 percent by weight of stearic acid, 0.5 to 8 percent by weight of oleic acid and 5 to 49 percent by weight of palmitic acid.

* * * * *